United States Patent
Fraiser

(10) Patent No.: US 9,654,235 B1
(45) Date of Patent: May 16, 2017

(54) WIRELESS CARRIER SIGNAL ANALYTIC SYSTEM

(71) Applicant: NeoGeneration, LLC, Roswell, GA (US)

(72) Inventor: LeVar T. J. Fraiser, Milton, GA (US)

(73) Assignee: Neogeneration, LLC, Roswell, GA (US)

( * ) Notice: Subject to any disclaimer, the term of this patent is extended or adjusted under 35 U.S.C. 154(b) by 0 days.

(21) Appl. No.: 14/956,614

(22) Filed: Dec. 2, 2015

(51) Int. Cl.
| | |
|---|---|
| *H04B 1/60* | (2006.01) |
| *H04B 17/29* | (2015.01) |
| *H04W 24/06* | (2009.01) |
| *H04M 1/24* | (2006.01) |
| *H04B 17/23* | (2015.01) |
| *H04W 88/02* | (2009.01) |

(52) U.S. Cl.
CPC ............. *H04B 17/29* (2015.01); *H04B 17/23* (2015.01); *H04M 1/24* (2013.01); *H04W 24/06* (2013.01); *H04W 88/02* (2013.01)

(58) Field of Classification Search
CPC ....... G01S 19/23; H04W 24/08; H04W 16/26; H04W 24/02; H04W 40/12; H04W 84/18
USPC ....................................... 455/7–25
See application file for complete search history.

(56) References Cited

U.S. PATENT DOCUMENTS

| | | | | |
|---|---|---|---|---|
| 7,565,106 | B1 * | 7/2009 | Oh .......................... | H04B 7/155 370/241 |
| 2009/0280741 | A2 * | 11/2009 | Krinsky ................. | H04H 20/26 455/3.06 |
| 2011/0256863 | A1 * | 10/2011 | Ramasamy ........... | H04W 24/08 455/424 |

OTHER PUBLICATIONS

"Distributed Antenna Systems", Connectivity Wireless Solutions, BICSI US North-Central Region Meeting, Warrenville, IL, Oct. 19, 2010, 81 pages.

* cited by examiner

*Primary Examiner* — Ronald Eisner
(74) *Attorney, Agent, or Firm* — Baker & Hostetler LLP

(57) ABSTRACT

A method, device, computer-readable storage medium, and system for determining key performance indicators of a wireless RF signal received by an antenna from a signal source. A diagnostic device may receive signal of a carrier network from a primary antenna. The diagnostic device may transmit the signal to a mobile device that is registered on the carrier network. A mobile device may receive the signal from the diagnostic device, demodulate the signal, and determine key performance indicators of the signal. The key performance indicators may be displayed in real-time. This allows a technician to orient the primary antenna so that it receives a signal from the signal source with the highest quality key performance indicators it can receive.

20 Claims, 8 Drawing Sheets

WIRELESS CARRIER SIGNAL ANALYTIC SYSTEM

TECHNICAL FIELD

Examples disclosed herein generally relate to telecommunications, specifically methods, devices, and systems that analyze radio frequencies.

BACKGROUND

Wireless signals are omnipresent in today's world. Over the past few decades the amount of devices that use wireless technology has risen exponentially. Some of the most common devices that use wireless technology today are smartphones and other cellular devices. Cellular companies compete to obtain the best coverage, including providing the best signal quality for their customers.

Cellular wireless signals typically use a higher frequency than other wireless technologies, and as a result have a more difficult time penetrating walls, foliage, underground, etc. To remedy this problem, some facilities equip a distributed antenna system (DAS). A DAS typically includes a primary antenna located on the top of a facility. The primary antenna receives a signal from a cellular network. The primary antenna then transmits the cellular network signal to antenna nodes dispersed throughout the facility that will broadcast the cellular network signal as well as receive incoming transmissions from user devices connected to the cellular network.

In order to obtain the highest quality signal, the primary antenna should be positioned in the optimal orientation toward the signal source. In order to determine the optimal orientation for the primary antenna, a radio frequency (RF) wireless scanner is typically used. However, RF wireless scanners used for this purpose have some significant drawbacks. First, they are extremely expensive, ranging from $20,000 up to $100,000. Second, they are bulky and heavy, which makes them difficult to take on-site. Third, each individual scanner is programmed to read a specific frequency band and technology, so multiple RF scanners must be purchased to be able to analyze each band and technology. These and other shortcomings are discussed herein.

SUMMARY

In various examples disclosed herein, methods, devices, and systems are disclosed for measuring the quality of an RF wireless signal received by an antenna. For example, in one example, a primary antenna at a facility may receive wireless signals from signal sources. A diagnostic device may be connected to the primary antenna. The diagnostic device may receive the signals from the primary antenna and transmit them to a mobile device. The mobile device may be registered on the wireless carrier network whose signal is being analyzed. The mobile device may deactivate (e.g., turn off) its wireless antenna so that it only receives a signal from the diagnostic device. The mobile device may determine key performance indicators (KPI) of the signal. The mobile device may transmit the KPIs back to the diagnostic device in real-time. The diagnostic device may show the KPIs on a display in real-time. A technician can use the KPIs to orient the primary antenna to optimize the signal the antenna receives from the signal source. In another example, the mobile device may display the KPIs in real-time on its own display instead of transmitting it back to the diagnostic device.

The disclosed subject matter may provide a less expensive, more portable, and universal way to measure the RF signal of a wireless carrier signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
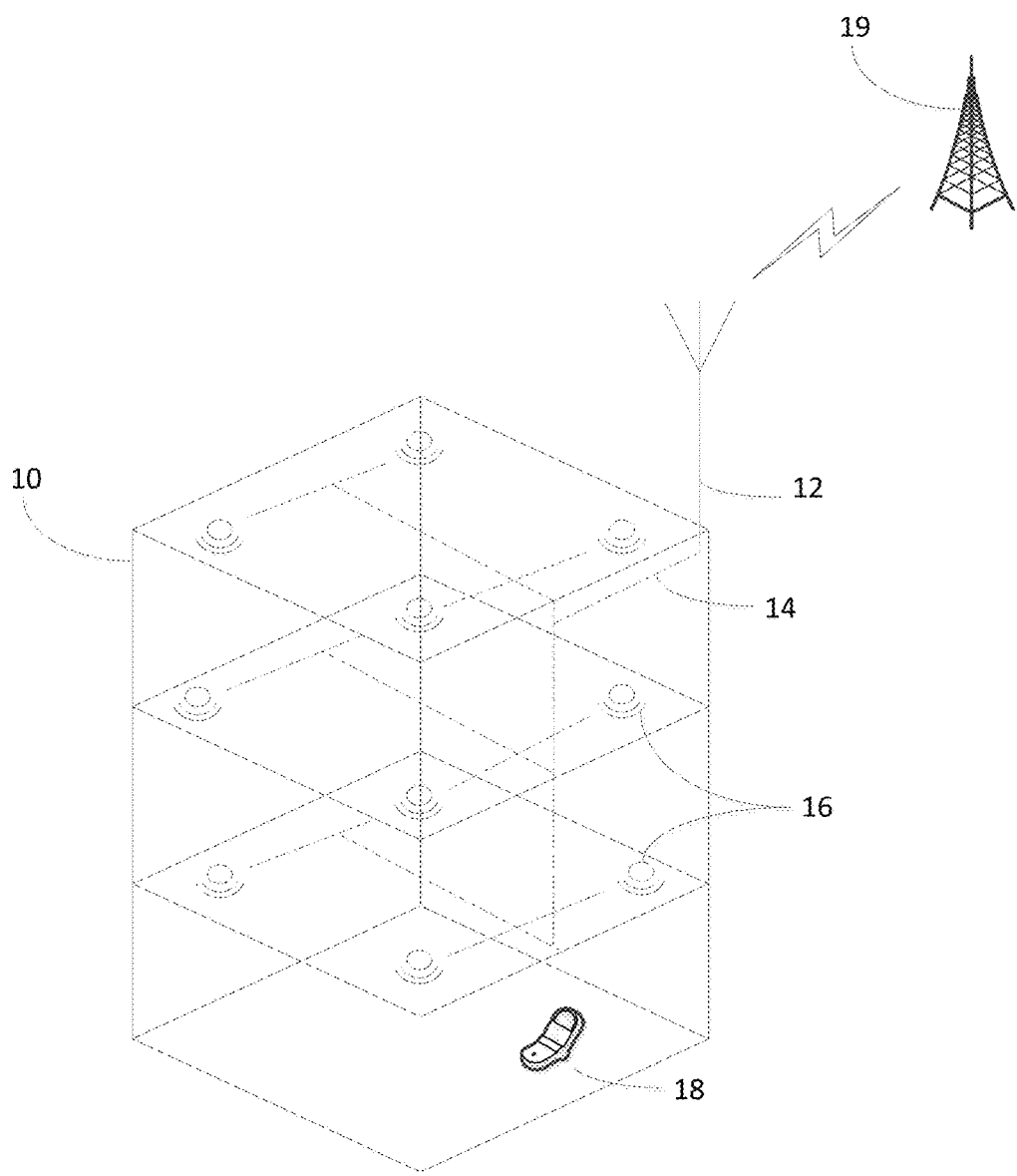
FIG. 1 illustrates a schematic diagram of an example DAS.

Conventional mobile devices by themselves are inadequate for determining RF signal quality. First, conventional mobile devices are not configured to directly connect to a primary antenna in order to receive the signal only from the primary antenna. Therefore a conventional mobile device cannot be used to determine the quality of a signal received by the primary antenna from the signal source. Second, since the antennae within a conventional mobile device are typically omni-directional, the conventional mobile device cannot determine the direction, relative to the mobile device, of the signal source to which the conventional mobile device is connected. Therefore, it would be difficult to tell if a conventional mobile device is connected to the same signal source as the primary antenna unless it is plugged directly into the primary antenna.

Disclosed herein is subject matter associated with a wireless carrier signal analytic system. The wireless carrier signal analytic system helps diagnose the quality of a signal without the need for conventional RF scanner equipment. In one example, a method is disclosed that includes receiving a wireless carrier signal from an antenna. The signal is transmitted to a mobile device where it is demodulated. The method also may include operations on the mobile device that determine key performance indicators (KPIs) of the signal. The KPIs may be displayed on a display.

In another example, a diagnostic device is disclosed that includes an input component to receive a carrier signal that a wireless antenna receives from a signal source. The diagnostic device also includes output components that allow it to transmit the carrier signal to a mobile device. The diagnostic device may also include a display that will allow it to display KPI information about the carrier signal received from the mobile device.

In another example, a system is disclosed that includes an antenna, a diagnostic device, and a mobile device. The antenna receives a carrier signal from a signal source. The diagnostic device is connected directly to the antenna, and the antenna transmits the carrier signal to the diagnostic device. The diagnostic device relays the signal to the mobile device that is registered on the carrier signal's network. A mobile device disables the wireless antenna so that the mobile device only receives an input signal from the diagnostic device. For clarity, the wireless antenna that is disabled is conventionally directly attached to the mobile device internally or externally. It is contemplated that other wireless services on the mobile device, such as Wi-fi and Bluetooth®, may remain enabled. The mobile device receives the carrier signal, demodulate the carrier signal, and determine KPIs of the carrier signal. The mobile device transmits the KPI information to the diagnostic device. The diagnostic device displays the KPI information on a display. In another example, the mobile device does not transmit the KPI information to the diagnostic device, and instead displays it on the display of the mobile device.

In view of the foregoing, the wireless carrier signal analytic system, through one or more of its various aspects or specific features or subcomponents, is thus intended to bring out one or more of the uses that are evident from the description. The wireless carrier signal analytic system is described with frequent reference to a distributed antenna system (DAS). It is understood, however, that a DAS is merely a specific example of a context in which the disclosed wireless carrier signal analytic system may be implemented.

A DAS is commonly used by wireless carriers in facilities to expand their wireless coverage. A DAS allows a wireless carrier to transmit the carrier signal from a signal source to a primary antenna at the facility. The primary antenna transmits the carrier signal to antenna nodes inside the facility that wirelessly broadcast the carrier signal. Users with mobile devices registered to the carrier's network can then communicate with the carrier's network through the DAS.

Because the carrier signal traffic in a DAS passes through the primary antenna, the quality of the carrier signal that mobile devices inside the facility receive will depend directly on the quality of the carrier signal that the primary antenna receives from the signal source. Wireless carriers desire for a DAS to provide a carrier signal with the highest quality to mobile devices. In order to achieve this, the primary antenna is usually positioned in an optimal orientation relative to the signal source.

Currently, a radio frequency (RF) scanner is used to measure the signal quality so that a primary antenna may be oriented. RF scanners are bulky, expensive, and each one can only be used with a particular carrier signal. The method, system, and devices disclosed herein may provide a cheaper, easier, and more universal way to orient primary antennae.

FIG. 1 illustrates a schematic diagram of an example DAS. A DAS may be installed in a building 10 that may suffer from poor wireless coverage within. Building 10 may be an office building, underground facility, or any other similar location. A primary antenna 12 may be attached to the outside of building 10. Primary antenna 12 may transmit the carrier signal to antenna nodes 16 dispersed throughout building 10 via network cables 14. Antenna nodes 16 may wirelessly broadcast the carrier signal throughout building 10, as well as receive signals from user device 18, such as a cellular phone. Antenna nodes 16 may relay signals form user device 18 to primary antenna 12 via network cables 14, and primary antenna 12 may in turn relay user device signals to the signal source 19.

Primary antenna 12 may be any antenna that receives carrier signals from signal source 19. Primary antenna 12 may also receive signals from user device 18, whether directly or through other nodes, such as antenna nodes 16, and relay the signal from user device 18 to signal source 19. Antenna nodes 16 may receive the carrier signal from primary antenna 12 via network cables 14. Antenna nodes 16 may broadcast the carrier signal wirelessly throughout building 10. Antenna nodes 16 may also receive signals from user device 18 that it transmits to primary antenna 12. Signal source 19 may be a transceiver from which primary antenna 12 receives a signal, such as a cellular tower, node, or base transceiver station (BTS).

The quality of the signal within building 10 that user device 18 receives may depend on the quality of the signal that primary antenna 12 receives from signal source 19. In order to receive a carrier signal with the best quality, primary antenna 12 needs to be positioned in its optimal orientation toward signal source 19. To obtain the optimal orientation of primary antenna 12, detailed information relating to the KPIs is needed.

As used herein, KPIs may include indicators of the quality of the carrier signal, such as the strength or noise level of the signal. The strength of the signal may refer to the receive power or amplitude of the carrier signal. A typical ideal range for a receive power for a signal may be between −40 dBm (decibel-milliwatts) and −85 dBm. The noise level may refer to the amount of interference in the signal. The signal quality may refer to the strength to noise ratio that measures how strong the signal is in comparison to how much noise is being received. This ratio may be determined by calculating an RxQual (Receiver quality) value, RSRQ (Reference Signal Received Quality) value, Ec/Io (Signal strength/interference) value, etc. As understood in the art, an RxQual value reflects the number of bit errors in a number of bursts, so an RxQual value close to zero is ideal. As the following equation demonstrates, an RSRQ value may be calculated by multiplying the number of resource blocks available (N) by the signal strength (RSRP) divided by the power received (RSSI).

$$RSRQ = \frac{N * RSRP}{RSSI}$$

An RSRQ value measures interference and noise information. Also, as understood in the art, Ec/Io measures the signal to interference ratio, more specifically the ratio of received energy per code bit. Ec/Io typically ranges from −10 to −40, which −10 being the best quality and −40 being the worst quality. KPI as discussed herein may include RxQual, RSRQ, Ec/Io, RSRQ, or RSSI, among other things. Based on set threshold levels of KPI as set herein primary antenna 22 may be moved or responses (e.g., haptic or audio feedback) provided by diagnostic device 24 or mobile device 26.

For example, if someone is connected on a mobile device telephone call via a particular carrier signal, the noise level of the carrier signal may affect the clarity of the audio. As an example, a mobile device may receive a strong signal, but a high amount of noise in the signal from a source. As a result, even though the signal is strong, the audio transmitted may be difficult for a user to understand, and would thus be a low quality signal. The same would be true if the noise level was low, but the signal strength was low as well. In order to provide the best signal to a mobile device, the signal strength should be maximized and the noise level minimized.

Figure 2:
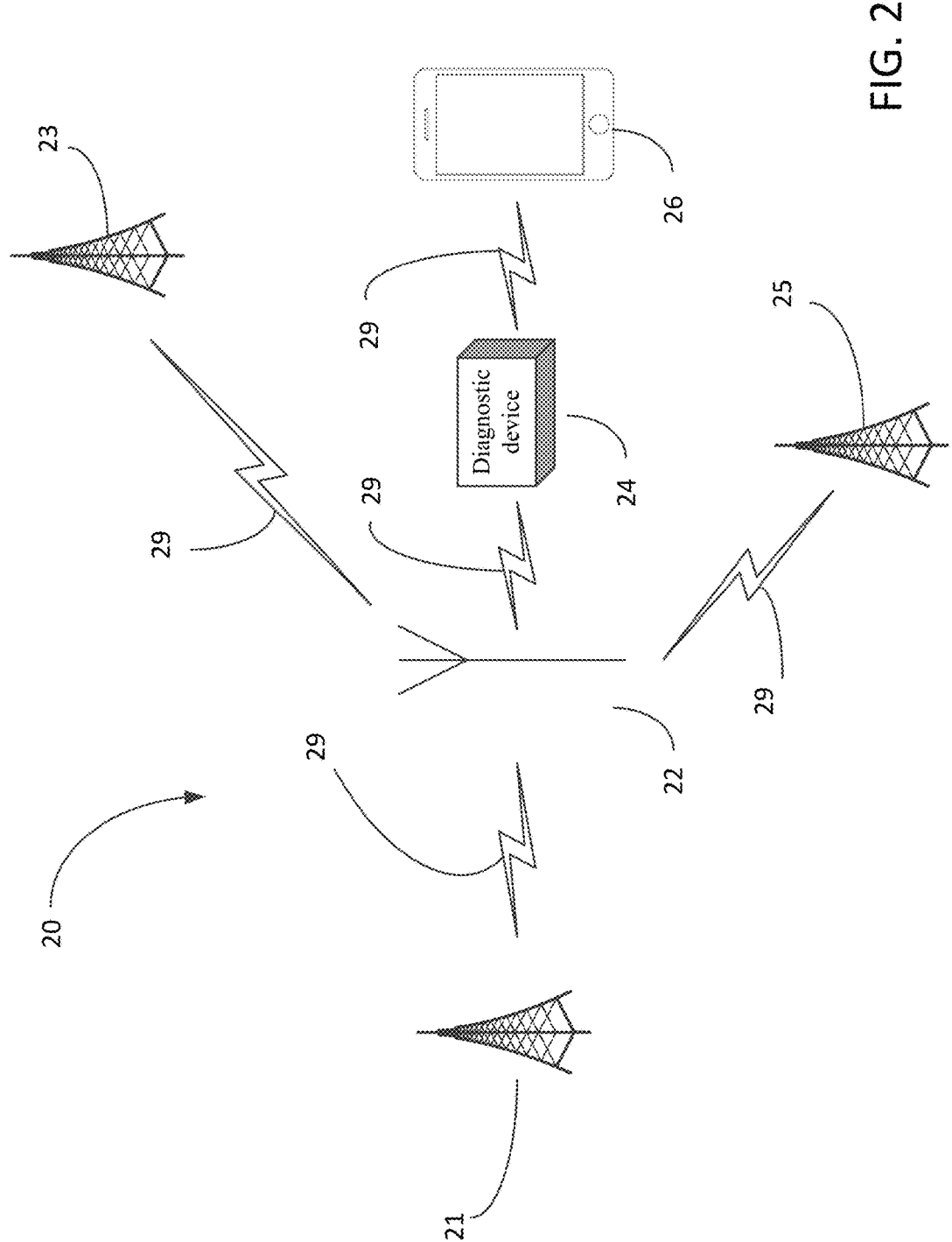
FIG. 2 illustrates a schematic drawing of an exemplary wireless carrier signal analytic system.

FIG. 2 is a schematic drawing of an example wireless carrier signal analytic system 20 of the present disclosure. The system 20 may include primary antenna 22, diagnostic device 24, and mobile device 26. Primary antenna 22 may receive input signal 29 from signal source 21, signal source 23, and signal source 25. Diagnostic device 24 may be connected to primary antenna 22. Primary antenna 22 may transmit input signal 29 to diagnostic device 24. Diagnostic device 24 may transmit input signal 29 to mobile device 26. Mobile device 26 may disable the wireless antenna of mobile device 26 so that it only receives an input signal from diagnostic device 24. It is contemplated, though, that other wireless services on mobile device 26, such as Wi-Fi and Bluetooth®, may remain enabled. Mobile device 26 may be registered on a carrier network whose carrier signal is part of input signal 29 received from diagnostic device 24. Mobile device 26 may demodulate input signal 29 in order to extract the carrier signal for the wireless carrier from input signal 29. Mobile device 26 may also determine which signal source 21, 23, or 25 is the source of the carrier signal to which mobile device 26 is connected. Mobile device 26 may determine KPIs of the carrier signal. Mobile device 26 may transfer the KPIs back to diagnostic device 24. Diagnostic device 24 may display the KPIs on a display. In another example, mobile device 26 does not transfer the KPIs back to diagnostic device 24, and instead displays the KPIs on its own display. The KPIs may be displayed as a snapshot (e.g., the KPIs associated with a particular instant or period of time) or in real-time.

Real-time as discussed herein refers to operations that usually occur in milliseconds, but not more than one second. The term near real-time refers to the time delay introduced by automated data processing or network transmission, between the occurrence of an event and the use of the processed data, such as for display or feedback and control purposes. For example, a near-real-time display depicts an event or situation as it existed at the current time minus the processing time, as nearly the time of the live event. Near real-time events usually occur within seconds.

Primary antenna 22 may be any antenna that receives input signal 29 from multiple signal sources, such as signal source 21, signal source 23, or signal source 25. For example, primary antenna 22 may be a directional antenna or other similar types of antennae. Signal source 21, signal source 23, and signal source 25 may broadcast or receive a carrier signal of a wireless carrier, such as a cellular tower. Input signal 29 may be one or a combination of signals that contains at least a carrier signal from a wireless carrier. Diagnostic device 24 may be any device that may connect to primary antenna 22, receive input signal 29 from primary antenna 22, connect to mobile device 26, and transmit input signal 29 to mobile device 26. Diagnostic device 24 may connect to primary antenna 22 via a hard wired connection, such as a coaxial cable. The coaxial cable may be configured with any of a variety of radio frequency (RF) connectors, such as a Threaded Neill-Concelman (TNC) connector or a SubMiniature version A (SMA) connector. Diagnostic device 24 may include an interface configured to effectuate the hard-wired connection with primary antenna 22. For example, the interface may include a port configured to interconnect with an RF connector of a coaxial cable, such as a TNC or SMA connector. Diagnostic device 24 may also include any combination or sub-combination of ports.

Input signal 29 may be any range of signals that primary antenna 22 can receive. This may often include one or more carrier signals. A carrier signal may be a modulated waveform that is usually a much higher frequency than the input signal. Modulation may be the process by which one or more properties of a periodic waveform in a carrier signal is altered. Modulation allows carrier signals of different frequencies to share a common physical transmission medium. Modulation may also be used to encode the signal so that only a desired receiver can read the carrier signal. Therefore, an input signal may include multiple carrier signals. Demodulation may be the act by which the original information from a modulated carrier wave is extracted. With wireless carriers, a mobile device has a carrier-specific algorithm that allows it to demodulate that carrier's signal. Once the carrier signal is demodulated, the mobile device can read the information being carried on the carrier signal.

Diagnostic device 24 may be configured to communicatively connect to mobile device 26 in a variety of ways, including wirelessly, via Bluetooth®, or a hard-wired connection, such as a Universal Serial Bus (USB) cable. Diagnostic device 24 may be configured to receive KPIs of the carrier signal from mobile device 26. The KPIs may be displayed as a snapshot or in real-time. Diagnostic device 24 may also have a display on which it can display the KPIs in real-time.

Mobile device 26 may be any device that may connect to a wireless carrier network, such as a cellular phone, a smart phone, tablet computer, or personal digital assistant. A wireless carrier network may be any wireless carrier that broadcasts carrier signals to mobile devices, usually for communication purposes, such as T-Mobile®, Verizon Wireless®, Sprint®, or AT&T®. A carrier signal may be a signal sent from a wireless carrier for purposes of allowing end users to communicate with the wireless network. Mobile device 26 may be registered on the network of the carrier signal included within input signal 29. Often, input signal 29 may include multiple carrier signals. Mobile device 26 may be configured to demodulate input signal 29 so that it may extract and read the carrier signal of the wireless carrier on which mobile device 26 is registered. Mobile device 26 may analyze the carrier signal to determine KPIs of the carrier signal. Mobile device 26 may also be able to determine from which of signal source 21, signal source 23, or signal source 25 the carrier signal originates. This may be determined using a source database provided by the wireless carrier. Mobile device 26 may transmit the KPIs to another device, such as diagnostic device 24, to be displayed. Mobile device 26 may also display the KPIs on its own display. The KPIs may be displayed as a snapshot or in real-time.

One of the benefits of wireless carrier signal analytic system 20 is that the diagnostic device 24 is universal with respect to carrier signals. Diagnostic device 24 can receive any input signal 29 that contains the carrier signal from any carrier through primary antenna 22 and transmit it to mobile device 26. A technician would only need a mobile device 26 that is registered to the particular carrier network of the carrier signal in input signal 29. If a technician were to implement wireless carrier signal analytic system 20 on a different carrier's network, then he or she would only need a phone or subscriber identity module (SIM) card associated with the different carrier. The same diagnostic device 24, and sometimes the same mobile device 26, could be used.

Figure 3:
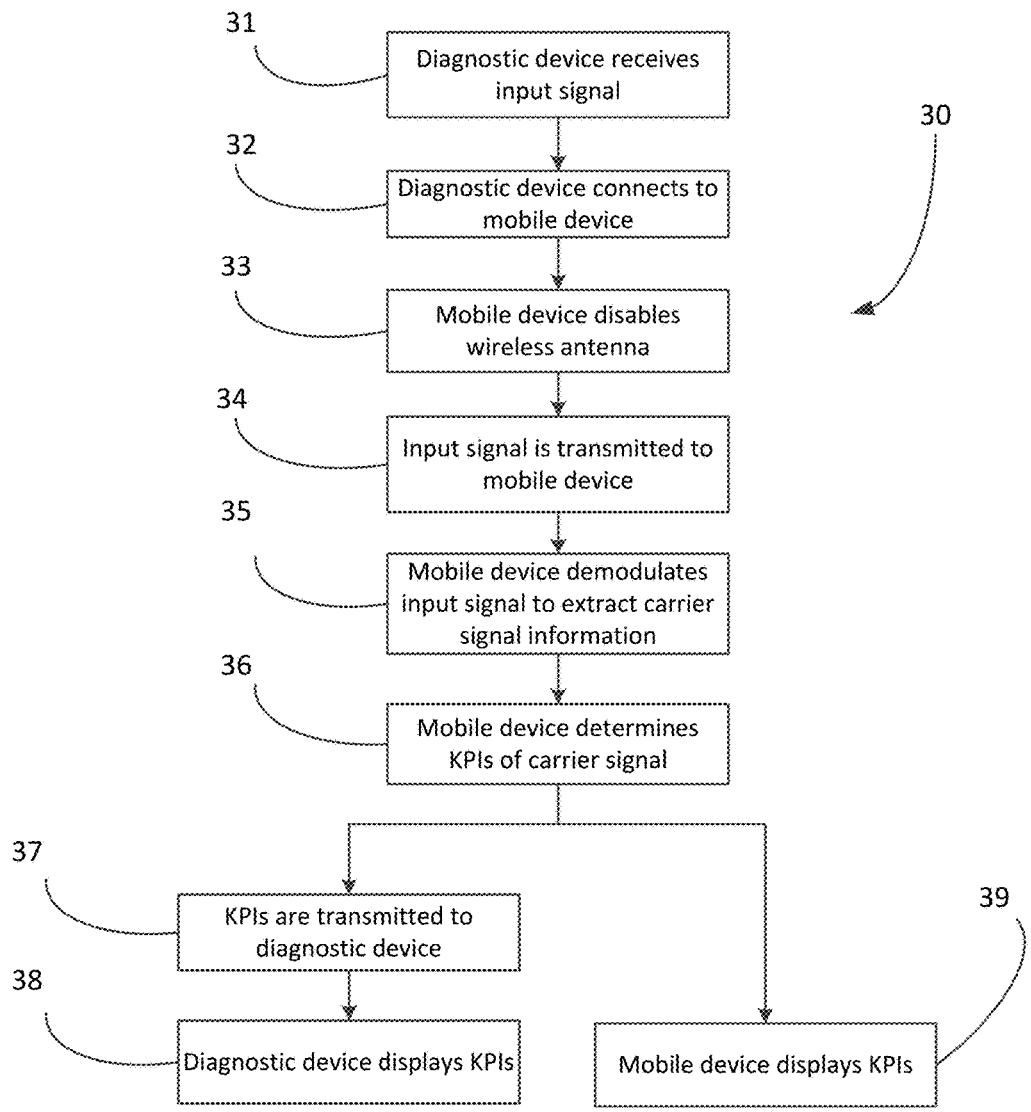
FIG. 3 illustrates an exemplary method of implementing a wireless carrier signal analytic system.

FIG. 3 illustrates an exemplary example of a method of implementing wireless carrier signal analytic system 20. In block 31, diagnostic device 24 receives an input signal from primary antenna 22. In block 32, the diagnostic device connects to mobile device 26. In block 33, mobile device 26 disables the mobile devices wireless antenna so that it only receives the signal from diagnostic device 24. In block 34, input signal 29 is transmitted to mobile device 26. In block 35, mobile device 26 demodulates input signal 29 to extract a carrier signal. In block 36, mobile device 26 determines KPIs of the carrier signal. In block 37, the KPIs are transmitted to diagnostic device 24. In block 38, diagnostic device 24 displays KPIs. Alternatively to blocks 37 and 38, in block 39 mobile device 26 displays the KPIs on a display on the mobile device. Based on the KPIs received in relation to a threshold level (e.g., optimal threshold of Ec/Io of −10), primary antenna 22 may be adjusted to receive an optimal quality signal from signal source 21, 23, or 25. Alternatively, primary antenna 22 may be adjusted to receive optimal signal from one or more signal sources, such as signal source 21, signal source 23, or signal source 25. In an alternate example, mobile device 26 may receive and demodulate input signal 29, as well as determine KPIs of the resulting carrier signal without disabling its wireless antenna.

For example, with additional reference to FIG. 2, diagnostic device 24 is plugged into primary antenna 22. Diagnostic device 24 receives input signal 29, which may contain a carrier signal associated with a particular wireless carrier. Diagnostic device 24 connects to mobile device 26, which is registered to operate on the network of the wireless carrier. Mobile device 26 disables the wireless antenna on mobile device 26 such that mobile device 26 receives and/or uses no other carrier signal other than the carrier signal received from diagnostic device 24. It is contemplated throughout that other wireless services on mobile device 26 may remain enabled. Diagnostic device 24 transmits the input signal to mobile device 26. Mobile device 26 demodulates the signal and extracts the carrier signal. Mobile device 26 determines KPIs of the carrier signal. Mobile device 26 transmits the KPIs to diagnostic device 24. Diagnostic device 24 displays the KPIs on a display of the diagnostic device 24. Alternatively, mobile device 26 displays the KPIs on its own display. The KPIs may be displayed as a snapshot or in real-time. With the KPIs displayed in real-time, primary antenna 22 may be oriented, based at least on the displayed KPIs, to obtain the best signal quality from one of signal source 21, signal source 23, or signal source 25.

For example, a technician connects diagnostic device 24 to primary antenna 22. He then connects diagnostic device 24 to mobile device 26 via Bluetooth®. Upon connecting to diagnostic device 24, mobile device 26 turns off the wireless antenna of mobile device 26 and only receives an input signal from diagnostic device 24. Input signal 29 is received from primary antenna 22, transmitted to diagnostic device 24, and then transmitted again to mobile device 26. Mobile device 26 demodulates input signal 29 in order to extract information from the carrier signal for the wireless carrier. Mobile device 26 determines KPIs of the carrier signal and displays them on the screen of mobile device 26. The technician then begins to adjust primary antenna 22. The KPIs are updated in real-time so that the technician can see how the KPIs change as he adjusts the antenna. The technician adjust primary antenna 22 to a first position and observes the KPIs. The technician may then adjust primary antenna 22 to a second position and observe the KPIs in comparison to the first position. The tech may continue to adjust primary antenna 22 and observing the KPIs until he finds the orientation of primary antenna 22 with the best KPIs. The technician may repeat the process for each of signal source 21, signal source 23, and signal source 25 to determine which signal source provides the highest quality signal to primary antenna 22.

In another example, mobile device 26 also emits audio related to the KPIs. Diagnostic device 24 may be configured to allow the technician to select ideal KPIs or range of KPIs. The audio may include a series of tones that increase in frequency as the observed KPI nears the preselected target KPI or range of KPIs. In this example, this technician may be able to adjust the orientation of primary antenna 22 without looking at the screen. The technician knows that as the tone frequency increases the KPIs are closer to the preselected target or range of KPIs. The audio could also indicate KPI levels using different decibel levels or tone types of audio. Diagnostic device 24 could also indicate KPIs using haptic feedback.

Figure 4:
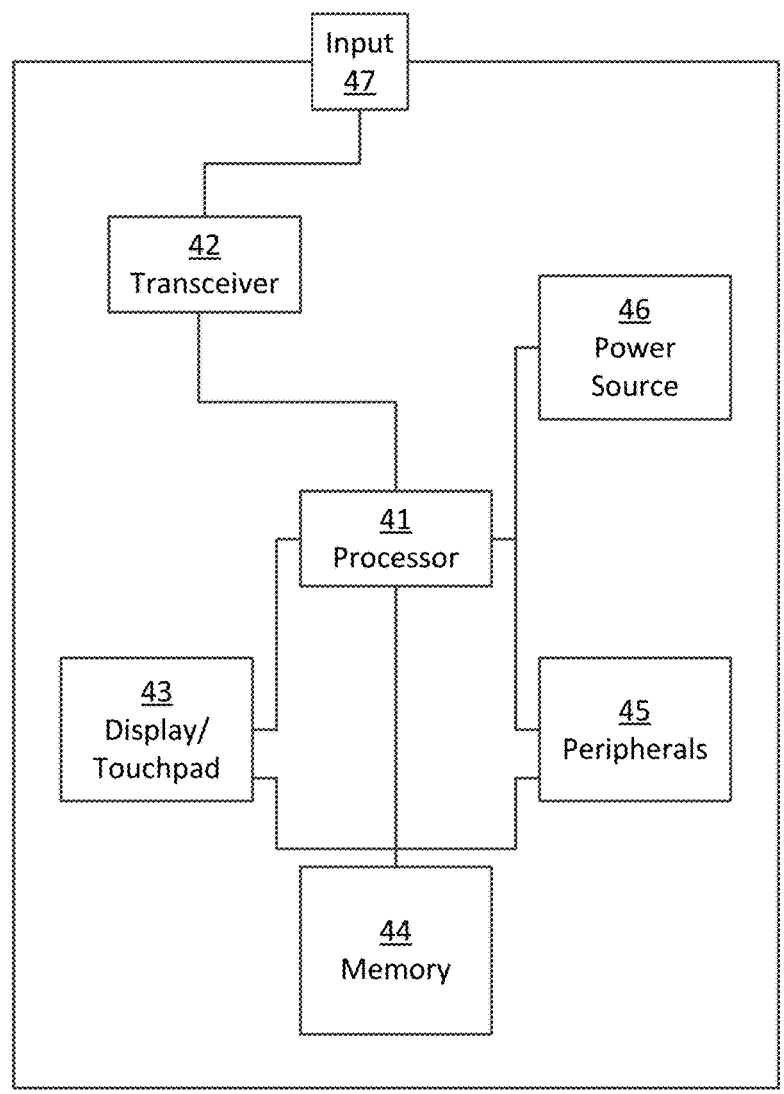
FIG. 4 is a schematic drawing of an exemplary diagnostic device that may be implemented in a wireless carrier signal analytic system.

FIG. 4 is a schematic drawing of a specific exemplary example of diagnostic device 24 that may be implemented in wireless carrier signal analytic system 20. Diagnostic device 24 may include a processor 41, transceiver 42, display/touchpad 43, memory 44, peripherals 45, power source 46, and input 47. It will be appreciated that diagnostic device 24 may include any sub-combination of the foregoing elements while remaining consistent with the present disclosure.

Processor 41 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 41 may include circuitry and other components that enable processor 41 to perform any of the functions and methods described herein. Such circuitry and other components may also enable processor 41 to communicate or interact with other devices and components, for example any other component of device of diagnostic device 24, in such a manner as to enable processor 41 and such other devices and/or components to perform any of the disclosed functions and methods. The processor 41 may perform signal coding, data processing, power control, input/output processing, or any other functionality that enables diagnostic device 24 to operate in a wireless or non-wireless environment. The processor 41 may be coupled to the transceiver 42. While FIG. 4 depicts the processor 41 and the transceiver 42 as separate components, it will be appreciated that the processor 41 and the transceiver 42 may be integrated together in an electronic package or chip.

Transceiver 42 may be configured to receive signals or data. For example, transceiver 42 can transmit and receive a signal from an antenna, such as primary antenna 22 from FIG. 2. Transceiver 42 can also transmit and receive signals or data from a device, such as mobile device 26 in FIG. 2. In an example, transceiver 42 may transmit and receive signals between primary antenna 22 through input 47, such as a TNC or SMA port typically used by primary antenna 22. In another example, transceiver 42 may transmit and receive signals between mobile device 26 via a wireless connection, such as Bluetooth®, or a wired connection, such as USB. It can be appreciated that transceiver 42 can transmit and receive in any combination of the above examples.

Processor 41 of diagnostic device 24 may be coupled to, and may receive user input data from, display/touchpad 43 (e.g., a liquid crystal display (LCD) display unit or organic light-emitting diode (OLED) display unit). The processor 41 may also output user data to display/touchpad 43. In addition, processor 41 may access information from, and store data in, any type of suitable memory, such as memory 44. The memory 44 may include random-access memory (RAM), a hard disk, or any other type of memory storage device.

Processor 41 may further be coupled to other peripherals 45, which may include one or more software and/or hardware modules that provide additional features, functionality and/or wired or wireless connectivity. For example, the peripherals 45 may include a universal serial bus (USB) port, a Bluetooth® module, speakers, and the like.

Processor 41 may receive power from the power source 46, and may be configured to distribute and/or control the power to the other components in diagnostic device 24. The power source 46 may be any suitable device for powering diagnostic device 24. For example, the power source 46 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Figure 5:
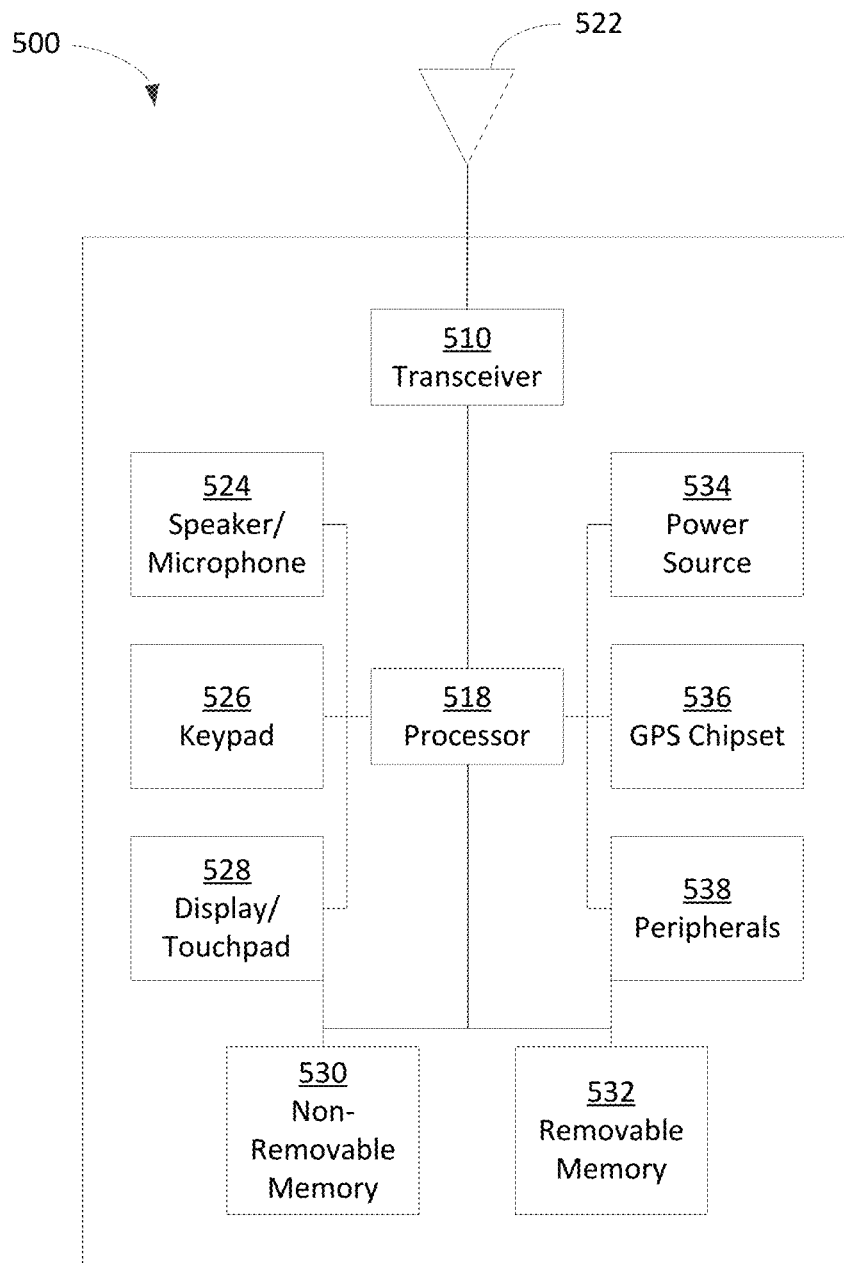
FIG. 5 illustrates an exemplary mobile device that may be used in the disclosed wireless carrier signal analytic system.

FIG. 5 is a system diagram of a mobile device 500 that may be used in conjunction with wireless carrier signal analytic system 20, such as mobile device 26 from FIG. 2. As shown in FIG. 5., mobile device 500 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and other peripherals 538. It will be appreciated that the mobile device 500 may include any sub-combination of the foregoing elements while remaining consistent with an example.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 518 may include circuitry and other components that enable processor 518 to perform any of the functions and methods described herein. Such circuitry and other components may also enable processor 518 to communicate and/or interact with other devices and components, for example any other component of device of mobile device 500, in such a manner as to enable processor 518 and such other devices and/or components to perform any of the disclosed functions and methods. The processor 518 may perform signal coding, data processing, power control, input/output processing, and/or any other functionality that enables the mobile device 26 to operate in a wireless environment. The processor 518 may be coupled to the transceiver 520, which may be coupled to the transmit/receive element 522. While FIG. 5 depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a wireless node. For example, in one example, the transmit/receive element 522 may be an antenna configured to transmit and/or receive RF wireless signals. In another example, the transmit/receive element 522 may be an emitter/detector configured to transmit and/or receive IR, UV, or visible light signals, for example. In yet another example, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 5 as a single element, the mobile device 500 may include any number of transmit/receive elements 522. More specifically, the mobile device 500 may employ MIMO technology. Thus, in one example, the mobile device 500 may include two or more transmit/receive elements 522 (e.g., multiple antennas) for transmitting and receiving wireless signals.

The transceiver 520 may be configured to modulate the signals that are to be transmitted by the transmit/receive element 522 and to demodulate the signals that are received by the transmit/receive element 522. As noted above, the mobile device 500 may have multi-mode capabilities. Thus, the transceiver 520 may include multiple transceivers for enabling the mobile device 500 to communicate via multiple RATs, such as UTRA and IEEE 802.11, for example.

The processor 518 of the mobile device 500 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other examples, the processor 518 may access information from, and store data in, memory that is not physically located on the mobile device 500, such as on a server or a home computer (not shown).

The processor 518 may receive power from the power source 534, and may be configured to distribute and/or control the power to the other components in the mobile device 500. The power source 534 may be any suitable device for powering the mobile device 500. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the mobile device 500. In addition to, or in lieu of, the information from the GPS chipset 536, the mobile device 500 may receive location information from a wireless signal source, and/or determine its location based on the timing of the signals being received from two or more nearby base stations. It will be appreciated that the mobile device 26 may acquire location information by way of any suitable location-determination method while remaining consistent with an example.

The processor 518 may further be coupled to other peripherals 538, which may include one or more software and/or hardware modules that provide additional features, functionality and/or wired or wireless connectivity. For example, the peripherals 538 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

It should also be noted that the certain implementations of the present disclosure as described herein may be stored on a tangible storage medium, such as a memory. The present disclosure is considered to include a tangible storage medium or distribution medium, as listed herein and including art-recognized equivalents and successor media, in which the certain implementations herein are stored.

Accordingly, those skilled in the art will recognize that the present disclosure extends to computer readable media ("CRM") containing instructions for execution by a processor on, for example, a mobile device. CRM is broadly defined to include any kind of memory such as conventional hard disks, Flash ROMs, nonvolatile ROM, RAM, solid state media, together with processors to execute the instructions.

Figure 6:
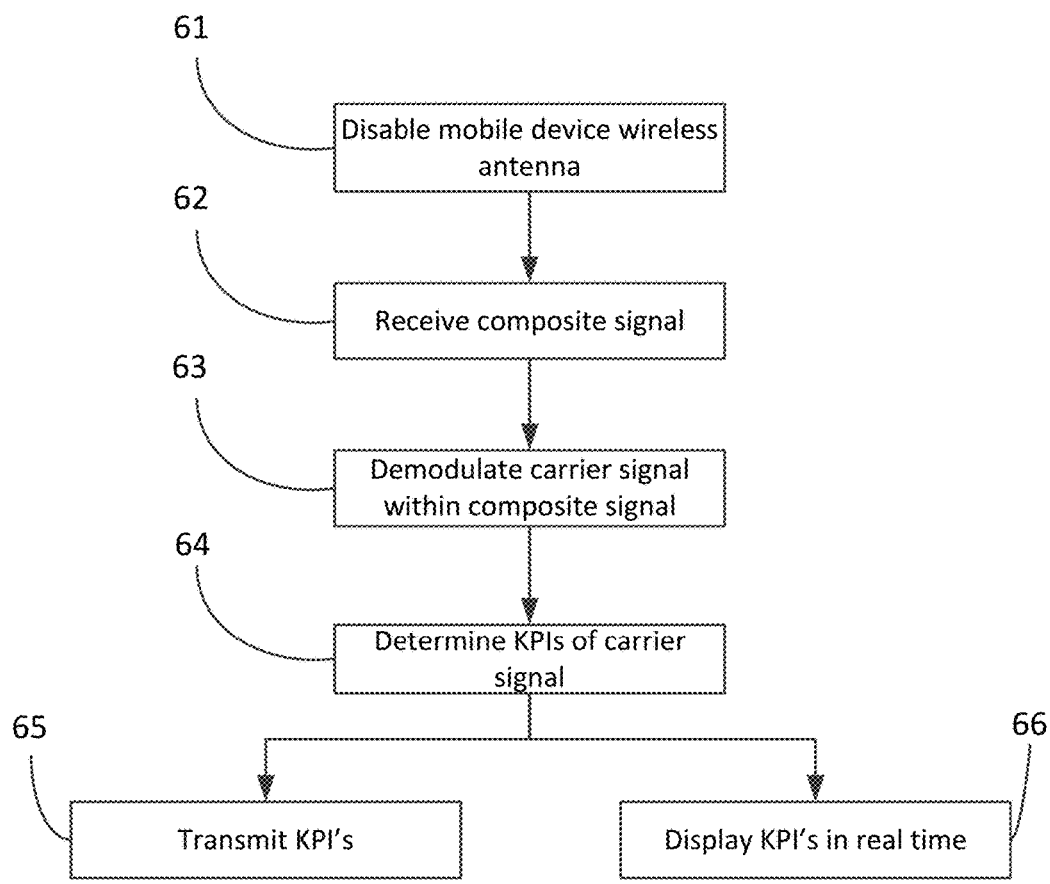
FIG. 6 illustrates an exemplary method for implementing a wireless carrier signal analytic system.

FIG. 6 illustrates an exemplary example of instructions that, when executed by a processor, can be implemented in wireless carrier signal analytic system 20 from FIG. 2. In this exemplary example, the instructions may be implemented to the processor in mobile device 26 from FIG. 2. In block 61 the processor disables the wireless antenna on mobile device 26. It is contemplated that other wireless services on mobile device 26 may remain enabled. In block 62, mobile device 26 receives a carrier signal, such as input signal 29 from FIG. 2. In block 63, the processor demodulates the carrier signal using an algorithm from the wireless carrier in order to extract the carrier signal from the input signal. In block 64, the processor determines KPIs of the carrier signal. In block 65, the processor transmits the KPIs to diagnostic device 24 from FIG. 2 to be displayed. In an alternative example, the mobile device displays the KPIs on the display of mobile device 26. In another example, instead of the KPIs being transmitted to be displayed or displaying the KPIs on the display of mobile device 26, a speaker, such as speaker 524 from FIG. 5, on mobile device 26 makes a sound that represents the KPIs of the signal. The KPIs may be displayed as a snapshot or in real-time.

Figure 7:
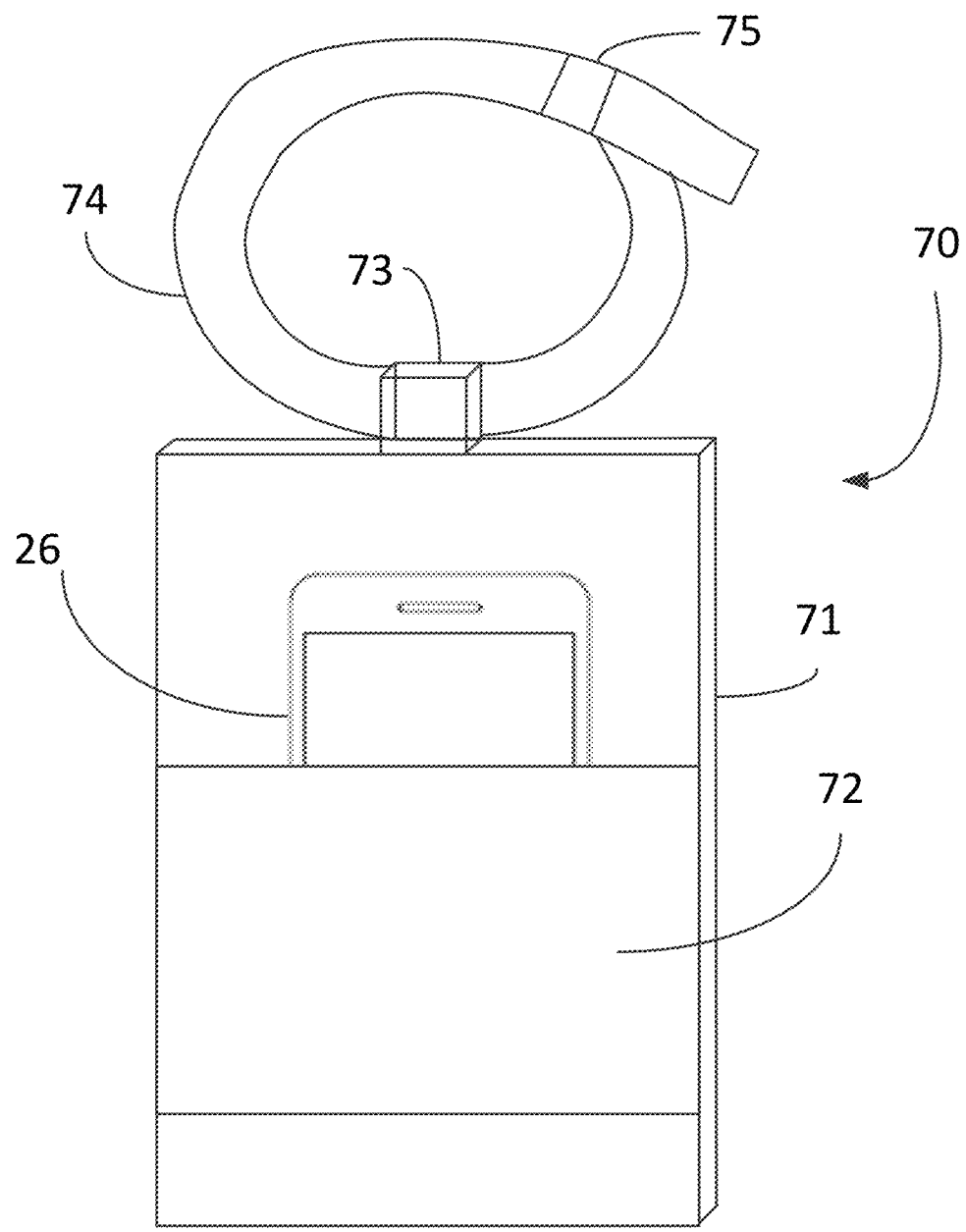
FIG. 7 illustrates a schematic diagram of a mobile device-antenna connector.

FIG. 7 illustrates a schematic diagram of a mobile device-antenna connector 70 that can be implemented as part of wireless carrier signal analytic system 20. Mobile device-antenna connector 70 may include baseplate 71, securing mechanism 72, strap connector 73, connector strap 74, and strap lock 75. Mobile device 26 may be secured to baseplate 71 via securing mechanism 72. Strap connector may attach to baseplate 71 and also connector strap 74. Connector strap 74 can be secured using strap lock 75. In an aspect, mobile device-antenna connector 70 does not include strap connector 73, and connector straps 74 connect directly to baseplate 71.

Baseplate 71 can be any device or surface in which mobile device 26 may be placed flush against. Baseplate 71 may further include a padding (not shown) on the side opposite the mobile device in order to provide protection to primary antenna 22 and allow baseplate 71 to be disposed flusher to the surface of primary antenna 22. Securing mechanism 72 may be any device or mechanism that will secure mobile device to baseplate 71, such as a sleeve, straps, buckle, etc. Strap connector 73 may be any device that will connect connector straps 74 to baseplate 71. Strap connector 73 may be adjustable so that baseplate 71 can be disposed flush against primary antenna 22. Strap lock 75 may be any device that can secure connector straps 74, such as Velcro®, buttons, a buckle, etc.

Mobile device-antenna connector 70 may be placed flush against primary antenna 22 such that mobile device 26 sits in the same orientation as primary antenna 22. In other words, the largest surface, typically the surface with the screen, may be disposed perpendicular to the direction in which primary antenna 22 is directed. Connector straps 74 may connect directly to primary antenna 22. Connector straps 74 may also connect to any connector piece on primary 24, such as an outgoing or incoming port.

Figure 8:
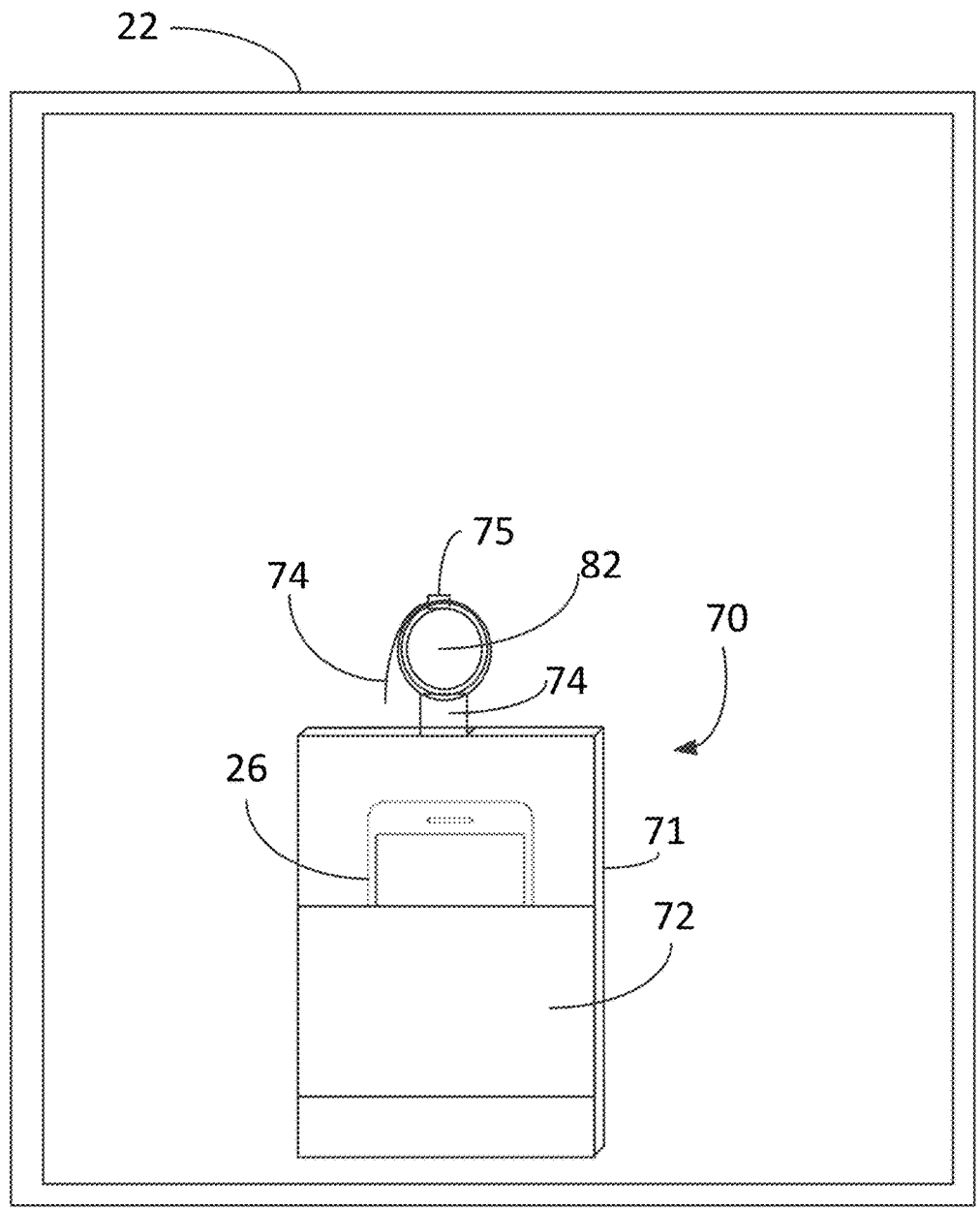
FIG. 8 illustrates a mobile device connected to an antenna using a mobile device-antenna connector.

FIG. 8 illustrates mobile device 26 connected to primary antenna 22 using a mobile device-antenna connector 70. Mobile device 26 may be secured to baseplate 71 using securing mechanism 72. Connector strap 74 may wrap around and be secured to port connector 82 of primary antenna 22. In another aspect, connector strap 74 wraps around primary antenna 22.

Mobile device-antenna connector 70 may provide another means that will allow primary antenna 22 to be oriented in order to obtain the highest quality signal from signal source 19. For example diagnostic device 24 may be connected to primary antenna 22. Diagnostic device 24 may transmit input signal 29 to mobile device 26. Mobile device 26 may be configured to disable its wireless antenna such that it only receives an input signal from diagnostic device 24. Mobile device 26 may demodulate input signal 29 in order to extract a carrier signal for a specified carrier, and also determine KPIs of that carrier signal. Mobile device may be attached to primary antenna 22 via mobile device-antenna connector 70. A technician may begin adjusting the position of primary antenna 22. Mobile device 26 may be further configured to use accelerometers and orientation determination capabilities within mobile device 26 to determine and track the KPIs of the carrier signal as the position of mobile device 26 changes. As the technician adjusts the position of primary antenna 22, mobile device 26 keeps track of which orientation (e.g., azimuth) achieved the best quality signal. Mobile device 26 can then display in which orientation primary antenna 22 received the highest quality signal, and the technician can orient primary antenna 22 in that position.

The subject matter disclosed herein may provide a number of benefits. First, a diagnostic device, unlike an RF wireless scanner has the capability of relaying carrier signals used by a variety of different carrier networks from a primary antenna to a mobile device. As long as the technician has a mobile device registered on the desired carrier network and has the required software on the mobile device, he can use the diagnostic device and the mobile device together to determine KPIs for the signal so that the corresponding primary antenna may be optimally oriented. In order to orient a different antenna from a different carrier, the technician could use the same diagnostic device with a different mobile device (or different SIM card on the same mobile device in some cases) registered on the different carrier's network. In an example, the same mobile device may be used to determine KPIs of different carrier signals by exchanging SIM cards in the phone from the respective carriers. The disclosed subject matter may reduce the need to purchase an expensive RF wireless scanner for each carrier signal. Only a mobile device registered to the desired carrier's network would be needed in combination with a diagnostic device. The diagnostic device is also smaller, lighter, and thus more portable than typical RF wireless scanners.

The disclosed subject matter associated with a wireless carrier signal analytic system has been described with reference to several examples. It should be understood, however, that the words used are for descriptive and illustrative purposes, rather than as mere limitation. Although the wireless carrier signal analytic system has been described in terms of particular means, processes, materials, technologies, and the like, the disclosed subject matter extends to functionally equivalent technologies, structures, methods, and uses that are within the scope of the claims.

What is claimed:

1. A method, comprising:
   receiving, by a diagnostic device, an input signal from an antenna;
   transmitting, by the diagnostic device, the input signal to a mobile device associated with a wireless carrier network;
   demodulating, by the mobile device, the input signal to extract a carrier signal of the wireless carrier network;
   determining, by the mobile device, a key performance indicator of the carrier signal;
   displaying the key performance indicator; and
   disabling a wireless antenna of the mobile device, wherein the only input signal received by the mobile device is the input signal from the diagnostic device.

2. The method of claim 1, wherein the input signal is received from the antenna via a hardwired connection.

3. The method of claim 1, wherein the input signal is transmitted to the mobile device wirelessly.

4. The method of claim 1, wherein the key performance indicator comprises a quality of the carrier signal and a strength of the carrier signal, wherein:
   the strength of the carrier signal comprises an amplitude of the carrier signal; and
   the quality of the carrier signal comprises a signal strength to noise ratio of the carrier signal.

5. A method comprising:
   receiving, by a diagnostic device, an input signal from an antenna;
   transmitting, by the diagnostic device, the input signal to a mobile device associated with a wireless carrier network;
   demodulating, by the mobile device, the input signal to extract a carrier signal of the wireless carrier network;
   determining, by the mobile device, a key performance indicator of the carrier signal;
   displaying the key performance indicator;
   attaching the mobile device to the antenna; and
   determining an orientation of the antenna based on the position of the mobile device.

6. The method of claim 5, wherein the mobile device is disposed flush on the antenna such that the mobile device is perpendicular to the direction the antenna receives a signal.

7. A diagnostic device, comprising:
   an input component that receives an input signal from an antenna, the input signal comprising a carrier signal associated with a wireless carrier network;
   an output component that:
      transmits the input signal to a mobile device associated with the wireless carrier network; and
      receives, from the mobile device, a key performance indicator of the carrier signal; and
   a display that displays the key performance indicator.

8. The diagnostic device of claim 7, wherein the input component comprises a hardwired component.

9. The diagnostic device of claim 7, wherein the output component comprises a wireless component.

10. The diagnostic device of claim 7, wherein the key performance indicator comprises a quality of the carrier signal.

11. A system, comprising
    a diagnostic device comprising:
       a first processor; and
       a first memory coupled with the first processor, the first memory comprising a first executable instructions that when executed by the first processor cause the first processor to effectuate operations comprising:
          receiving an input signal from an antenna; and
          sending the input signal; and
    a mobile device communicatively connected with the diagnostic device, the mobile device associated with a wireless carrier network, the mobile device comprising:
       a second processor; and
       a second memory coupled with the second processor, the second memory comprising a second executable instructions that when executed by the second processor cause the second processor to effectuate operations comprising:
          disabling a wireless antenna of the mobile device, such that the only input signal received by the mobile device is the input signal from the diagnostic device;
          receiving the input signal from the diagnostic device;
          demodulating the input signal to extract a carrier signal of the wireless carrier network;
          determining a key performance indicator of the carrier signal; and
          providing instructions to display the key performance indicator.

12. The system of claim 11, wherein the diagnostic device receives the input signal from the antenna via a hardwired connection.

13. The system of claim 11, wherein the mobile device receives the input signal from the diagnostic device wirelessly.

14. The system of claim 11, wherein the key performance indicator comprises a quality of the carrier signal.

15. The system of claim 14, wherein the quality of the carrier signal is measured by determining a ratio of a strength of the carrier signal and a noise level of the carrier signal.

16. The system of claim 11, wherein the mobile device is attached to the antenna.

17. The system of claim 16, wherein the second executable instructions further comprises:
   recording the KPIs of the signal with respect to the orientation of the mobile device; and
   providing instructions to display an orientation of the mobile device with a specified key performance indicator.

18. The system of claim 11, wherein the diagnostic device or the mobile device emits a sound correlating to the key performance indicator.

19. The system of claim 18, wherein the sound is emitted at varying frequencies or decibel levels to represent the key performance indicator of the carrier signal approaching a threshold level.

20. The method of claim 5, wherein the key performance indicator comprises a quality of the carrier signal, wherein the quality of the carrier signal comprises a signal strength to noise ratio of the carrier signal.

* * * * *